United States Patent [19]

Hansen et al.

[11] 4,126,475
[45] Nov. 21, 1978

[54] STRUCTURAL BUILDING COMPONENTS AND METHOD FOR PRODUCTION ON THE BASIS OF LATERITE

[76] Inventors: Torben C. Hansen; Thomas Ringsholt, both, c/o Building Materials Laboratory, Technical Univ. of Denmark, Bldg. 118, DK-2800 Lyngby, Denmark

[21] Appl. No.: 818,994

[22] Filed: Jul. 25, 1977

Related U.S. Application Data

[60] Division of Ser. No. 556,015, Mar. 6, 1975, Pat. No. 4,048,276, which is a continuation of Ser. No. 290,260, Sep. 18, 1972, abandoned, which is a continuation-in-part of Ser. No. 236,205, Mar. 20, 1972, abandoned.

[30] Foreign Application Priority Data

Mar. 22, 1971 [GB] United Kingdom ................ 7517/71

[51] Int. Cl.² .............................................. C04B 1/00
[52] U.S. Cl. ................................................... 106/118
[58] Field of Search ........................ 106/104, 118, 120

[56] References Cited

U.S. PATENT DOCUMENTS

| | | | |
|---|---|---|---|
| 915,060 | 3/1909 | Carson | 106/118 |
| 2,105,324 | 1/1938 | Huttemann et al. | 106/120 |

*Primary Examiner*—James Poer
*Attorney, Agent, or Firm*—Kenneth P. Synnestvedt

[57] ABSTRACT

Production of high strength structural building components by steam curing a compressed mixture of laterite, lime and water at a temperature preferably between 70° and 100° C.

12 Claims, No Drawings

STRUCTURAL BUILDING COMPONENTS AND METHOD FOR PRODUCTION ON THE BASIS OF LATERITE

This is a division of application Ser. No. 556,015, filed Mar. 6, 1975, and issued Sept. 13, 1977 as U.S. Pat. No. 4,048,276, which is a Continuation of application Ser. No. 290,260, filed Sept. 18, 1972, now abandoned, which, in turn, is a Continuation-in-Part of application Ser. No. 236,205, filed Mar. 20, 1972, now abandoned.

This invention concerns high strength structural building components and a method for production of such building components on the basis of laterite.

The general objective of the invention is the production of building components formed of minerals, which components are of exceptional quality, having an exceptional combination of physical and chemical characteristics including high strength, strength stability, dimensional and form stability, smoothness of surface, water repellency, chemical resistance and stability, fire resistance, frost resistance, and resistance to efflorescence. Moreover, the invention provides for the production of such high quality components from readily available and inexpensive minerals by a process which is simple and readily established and maintained even by personnel not having highly technical training.

Laterite is a soil or mineral which is formed by decomposition of bed-rock in tropical and subtropical zones of the earth and which upon analysis shows the presence of silicon oxide, iron oxide, and aluminium oxide. At least a portion of the aforementioned aluminium oxide and silicon oxide constituents are present generally in the laterite in a combined form such as complex aluminium silicates. Significant quantities of "free" silicon oxide (quartz sand) are usually present in the laterite. Usually relatively small amounts of free aluminium oxide are present in the laterite.

For the purpose of this invention, the term laterite is used in a broad sense as explained herebelow and includes what in the literature is referred to also as lateritic soil. Laterite is a yellow, brown or red-brown material of a more or less clayey character depending on the quantity and character of the iron and aluminium compounds it contains. For centuries laterite has been used as building material on certain locations, where it occurs in plastic consistency. On such locations it can be cut out in the form of building blocks and dried. It has also been mixed with lime and formed into blocks and permitted to age for long periods. However, such building blocks are highly porous and have low strength and uneven quality.

For what concerns this invention, it has been demonstrated that high strength structural building components can be produced from laterite, lime and water by means of a simple process. The strength, durability and other properties of resulting building components made from laterite, lime and water according to this process can be made at least equal to the quality of calcium silicate products such as sand-lime bricks and blocks. Moreover, this can be accomplished more economically in accordance with the technique according to the present invention.

Briefly described, the process used in this invention is characterized by the fact that a mixture of laterite, lime and, if necessary, water is pressed to form structural building units or components of the desired size and shape, after which the raw material or green shapes are steam cured for at least 2 hours at a temperature well above normal ambient temperatures but not higher than 100° C.

It is surprising that building components such as bricks, blocks, and beams of the same strength as sand-lime bricks and other calcium silicate products can be produced by means of this simple process, because production of sand-lime bricks requires steam curing at much higher temperatures, theoretically at least 140° C., in order for the reaction between quartz and lime to proceed. This necessitates the use of autoclaves or pressure chambers.

Although quartz sand is desirably present in the mix (for reasons which will be explained) the quartz is not important in the process reaction utilized according to the invention for development of the strength of the product. The lime employed reacts primarily with aluminium. It has been demonstrated by X-ray diffraction analysis and by a differential thermal analysis that in the process used in this invention calcium aluminate hydrates are formed, primarily of the composition $3CaO \cdot Al_2O_3 \cdot 6H_2O$, while, in contrast, calcium silicate hydrates are formed by reaction between lime and quartz in the production of calcium silicate products such as sand-lime bricks.

One of the characteristics of laterite for use in this invention which distinguishes it from other soils is that it contains appreciable amounts of iron oxide, for example, about 4 to about 50 weight percent, usually about 25 to about 45 weight percent. This is in contrast to other soils which do not contain iron oxide or which contain smaller amounts thereof. Compared to structural products prepared from such other soils, the structural products of the present invention have substantially higher strength. The iron oxide constituent of laterite used in the present invention is at least in part responsible for this. On the other hand, it is noted that structural products made from a soil such as marl, a soil which contains little or no iron oxide, but instead relatively high amounts of calcium carbonate, do not have nearly the strength of products of the present invention. Compared to iron oxide, the calcium carbonate affects the strength of products adversely. The iron oxide of laterite used in the present invention reacts much more slowly with lime than the aluminium. The reacted iron oxide forms a supplementary binding compound in the product, as will be explained below. Depending upon the time and temperature of curing, unreacted iron oxide will remain in the product. The unreacted iron oxide in the product is an effective filler which in contrast to other types of constituents in other soils does not affect adversely the strength of the product.

Although, as above indicated, laterite and lateritic soils of a wide variety of compositions may be utilized in the practice of the present invention, the material to be used should analyze to show presence of some appreciable quantities of aluminium and iron. Preferably, the aluminium, expressed as aluminium oxide, should comprise at least 8 percent of the weight of the laterite and the iron, expressed as iron oxide, should comprise at least 4 percent of the weight of the laterite. Laterite containing from about 8 weight percent to about 25 weight percent of aluminium, expressed as aluminium oxide, and from about 4 weight percent to about 50 weight percent but preferably not higher than about 45 weight percent of iron, expressed as iron oxide, it particularly desirable. Moreover, with respect to the quantity of silicon, expressed as silicon oxide, although up to about 80 or 90 weight percent may be present, for most purposes it is preferred that the quantity be not more than about 70 weight percent and most desirably between about 50 weight percent and about 10 weight percent. The presence of some silicon in the form of quartz and facilitates forming and prevents brittleness in the components produced. For this purpose about 10 to about 50 weight percent and preferably from about 15 to about 35 weight percent of the laterite should comprise quartz sand.

Certain ingredients in addition to silicon, aluminium and iron are also commonly present in the laterite, usually some chemically bound water in the complex aluminium silicates and iron oxides present, and also certain solids such as calcium and magnesium compounds. These other solid ingredients do not adversely affect the desired properties of the building blocks or other building components being made, especially where the quantity of the other solid ingredients is not too high, for instance is not above about 5 percent of the total weight of the laterite. Many laterites contain only about 1 or 2 percent of such other solids or even lesser amounts.

Thus, the content of alkaline ingredients for example, alkali and alkali earth metal compounds, in the laterite, in contrast to other types of soils is ordinarily very low because the laterite is formed under special climatic conditions in which such metals are leached out. This low content, for example, less than 1 percent, of such metals, which is characteristic of laterite, is highly desirable for the purposes of the present invention, and is a point of distinction from many clay type materials in which conditions of formation do not result in leaching out of the alkali and alkali earth metal compounds. Because of this, when the lime-laterite mix of the present invention is cured and the components are formed, they are quite different from the products made from various other clay type materials and also from Portland Cement based materials.

It is noted that structural products of relatively low strength have been made by combining other types of soils with cement and water wherein the cement serves as a binder. In utilizing laterite in accordance with the present invention, the calcium aluminate hydrate binder imparts such high strength to the product that it is not necessary to use cement to obtain a supplementary binding effect. Indeed, it has been found that the addition of cement to the laterite/lime composition of the present invention has a tendency to give a lower strength product. Furthermore, it is noted that a cement/laterite composition having no lime gives a product that is much lower in strength than the products of the present invention. Also, the preparation of a structural product from a laterite, lime and/or cement mix which is not prepared in accordance with the particular method steps provided by the present invention will result in a roduct that has much lower strength. It has been shown also that products prepared by firing laterite have substantially lower strength than those prepared in accordance with the present invention.

In addition to the foregoing, some free water is always present in natural deposits of laterite, such water being present in free capillary or adsorbed form. Such free water is available to enter into the reaction, but water chemically bound in aluminium silicates and iron oxides apparently does not enter into the reaction to any appreciable extent. Therefore, in calculating the water content and the water to be added, only the free water is taken into account.

In order to optimize properties of the components being made, the content of various constituents of the laterite may be adjusted, for instance by addition of one or two of the important constituents. For example, if the sand content is too low in relation to the other constituents, sand may be added. On the other hand the quantity of iron oxide may be increased by appropriate addition, or the aluminium may be increased for instance by adding a mineral containing aluminium silicates or aluminium oxides.

Although laterite is a mineral which is widely available and which generally has the desired constituents for use in the process of this invention, certain other soils are also known which contain appropriate quantities of these same constituents, for instance Bauxite, Terra Rossa, etc., found in countries such as France, Italy, Spain and certain parts of Australia, and these may also be used.

According to this invention, preferably a mixture is used consisting of 55–93 weight percent laterite, 2–25 weight percent lime calculated as CaO and up to 20 weight percent water. The mix proportion between laterite and lime depends on the composition of the laterite which can vary considerably. The quantity of water required depends on whether lime is used in the form of burnt lime (CaO) or slaked lime, and on the requirement that the pressed or molded but uncured components must be sufficiently coherent and shape retaining to withstand transport, handling and stacking without damage. Generally water must be added in order to satisfy the last-mentioned requirement.

According to this invention, a particularly well-balanced mix composition, which has proved to be suitable for most laterites, is about 70 to 85% laterite, about 5% to 15% lime as CaO, and about 10% to 15% water, for instance, approximately ¾ laterite, and the balance approximately ⅛ lime as CaO and ⅛ water, the proportions being by weight. The 5 to 15% range for the lime content is of special advantage because of the high strength values attained in that range. The strength of components made when using lime in that range is markedly higher than the strength obtained with either less or more lime.

When mixing laterite, lime and water, laterite can be used in the form in which it occurs naturally, provided the grain size distribution is acceptable. For effective reaction and high strength it is desirable to have small particle size in order to provide large exposed surface area and minimum porous and weak portions within the products. With these considerations in mind, most of the laterite should have a particle size about 2mm or less. A certain amount of the laterite, for instance up to about 10 percent by weight may comprise larger particles, but these larger particles should not exceed about 4mm. Usually laterite in natural deposits has a sufficient content of small size particles (smaller than 2 mm), but crushing may be resorted to is necessary in order to provide the desired small particle size. Larger grains and lumps can be removed by sieving.

In the laterite taken for use, the quartz sand present, or if quartz sand is added, it is advantageous that the sand be present in at least two different particle sizes. For instance, it is advantageous that some of the sand, for example about one-third be in a particle size ranging from about 2 to 4mm, and two-thirds in particle size less than 2mm. It has been found that particles of different size tend to interfit and give less porosity with consequent higher strength.

According to this invention, the pressure molded components are steam cured, preferably in the range between about 70°–80° C. and 97°–100° C. It has been found in accordance with this invention that this temperature range is important in insuring the development of maximum strength of the products. Even if products of the same composition are steam cured for great lengths of time at a temperature appreciably below about 70° C., maximum strength is not achieved. This has been shown by steam curing at a temperature of 60° or lower for periods of time even as long as 80 days, which did not produce as high strength as when the same composition was steam cured between about 70° and 100° C. in a much shorter period. Moreover, when steam curing at the lower temperatures the increase in strength with increase in curing time tends to level off so that the high strengths obtainable with the higher temperatures are never attained, regardless of how long the curing is continued.

However, where very high strength is not of importance and, in addition, where time is of small import, products can be steam cured at temperatures considerably lower than 70° C., for instance down to about 40° C.

In any event, any of the temperatures of steam curing herein contemplated can be produced by solar heat, provided the pressed raw components are enclosed or covered in the special manner hereinafter described.

The strength of the products formed in accordance with the present invention is dependent not only on the curing temperature but also on the time of curing. By way of explanation it is noted that the reaction of the lime, aluminium and water can result in the formation of various types of calcium aluminate hydrates, for example:

(a) $3CaO.Al_2O_3.6H_2O$;
(b) $2CaO.Al_2O_3.8H_2O$; and
(c) $4CaO.Al_2O_3.19H_2O$.

The aforementioned hydrates of (b) and (c) are unstable and convert to the aforementioned hydrate (a). (It is noted that the aforementioned stable hydrates (a) will incorporate also silicon and iron, the source of the silicon being free or reactive silicon ions liberated from the aluminium silicate. The stable hydrates (a) will therefore to some extent comprise phases belonging to a so-called solid solution series of calcium aluminate hydrates, calcium ferric hydrates and calcium silicate hydrates.) In the practice of the present invention it is preferred that the hydrates formed be primarily the aforementioned hydrates (a). If the curing is not accomplished at a sufficiently high temperature or if the curing is perhaps terminated prematurely, the hydrates of the resulting product will comprise primarily the unstable hydrates (b) and/or (c). This is disadvantageous because building products comprised primarily of the unstable hydrates will have a tendency to degrade. For example in the case of a building constructed of components containing unstable hydrates, there will be a tendency for conversion of the unstable hydrates to the stable hydrates. This will tend to destroy the integrity of the bonds between the particles of the mass of material of which the component is formed, thereby resulting in disintegration of the components. Although such products may initially have acceptable strength, they do not have strength stability. Once the integrity of the bond is broken, the bond is not reformed in the absence of steam curing. Such steam curing, of course, cannot be reapplied to a constructed wall.

In connection with the time of curing, it is pointed out that the length of time influences the strength of the product. Curing should be continued at least until a compressive strength of 70 kg/cm² is attained. In the case of curing at various of the temperatures herein contemplated, curing produces a predominance of the stable hydrates and if the time of curing is extended sufficiently, very high strength products can be obtained. In the case of curing at a very low temperature for instance of the order of about 40° C. or lower, the curing produces a predominance of the unstable hydrates and while increase in time will increase the amount of hydrates produced, such increase in time will not alter the proportion of stable and unstable hydrates being produced. For this reason it is important to effect curing at a temperature especially above about 70° C. which will ensure production of a predominance of the stable hydrates, and at such a temperature the very high and stable strengths may be attained within a reasonable time. At temperatures in the preferred range of about 70°–80° up to 97°–100° C., it is preferred to continue the steam curing for at least 2 hours, and most desirably until the compressive strength rises at least to 140 kg/cm² and ordinarily adequate strength will be provided within a day or two.

The forming pressure used also influences the strength, strength stability and form stability of the product. By way of explanation, it is noted that in the reaction of the laterite, lime and water, aluminium ions are dissolved from the calcium aluminium silicates and the aluminium ions react with dissolved calcium ions from the lime thereby forming calcium aluminate hydrate binder, which, as mentioned above, can include also calcium aluminate hydrates incorporating silicon and iron. As the binder forms it precipitates on and between the other constituents. It is important to the strength and strength stability of the product that the binder as it is formed be brought into intimate contact with the other mineral grains, for example, quartz sand and iron oxide, over a wide surface area and preferably over as wide a surface area as possible, with the grains brought as close as possible, thereby forming strong bonds with said mineral grains. This is accomplished by applying pressure during the forming and molding of the reaction mixture. The application of pressure to the reaction mixture also compacts it, thereby minimizing the size and number of pores in the resulting product. This, too, increases the strength of the resulting product.

Another important advantage of the method of the present invention is that the reaction mixture comprising the laterite, lime and water will generally be of a consistency such that the pressure applied to the mixture during forming or molding thereof can be promptly terminated, for example, even within a matter of seconds. This is surprising since the consistency of the reaction mixture preferably used in a pressure mold is a free flowing granular or powder mass. Notwithstanding this consistency, after the mixture has been pressure molded into the desired shape, the component is coherent and will retain its shape and can readily be transferred apart from the mold of an appropriate place for curing. Thus the application of pressure for relatively long periods of time to the reaction mixture of this invention is not necessary, and the molds can immediately be released for reuse. This distinguishes the present invention from prior processes involving the molding of other types of soils where the pressure and/or the molding must be continued for relatively long periods of time, and if this is not done the formed mixture will not retain its shape.

In pressure forming the components of this invention, it is preferable to employ a pressure of from about 50 kg/cm$^2$ to about 500 kg/cm$^2$. Lower pressures tend to give a product of reduced strength. Higher pressures can be used, but they are more costly to apply.

The invention contemplates also facilitating the compression and/or increasing the strength of the building components by the use of surfactants or wetting agents. For example, it has been found that the addition to the water of 0.5 weight percent of an anionic sulphonate type surfactant in a reaction mixture of the present invention results in the production of components that are about 30 to about 40 percent stronger than components made from the same reaction mixture except for the absence of the surfactant. The surfactant can be of anionic, cationic, nonionic or amphoteric type. A mixture of different types of surfactants can be used also. Examples of anionic surfactants include: fatty acid, rosin and naphthenic acids soaps; sulfuric acid esters such as alkyl sulfates and sulfated oils and esters thereof; sulfonic acids such as alkyl and alkyl-aryl sulfonates and sulfonated amides and esters. Specific examples of anionic surfactants include sodium sulfate, dioctyl sodium sulfosuccinate and the sodium salt of alkyloxy polyester sulfate. Examples of cationic surfactants are materials such as simple amine salts, quaternary ammonium salts and amino amides. Specific examples of cationic surfactants include undecylamine acetate, polyoxyethylene alkyl amines and trimethyloctadecyl ammonium chloride. Examples of amphoteric surfactants are those containing amino and carboxyl groups or amino and sulfuric ester or sulfonic groups. Examples of nonionic surfactants are: esters such as sorbitan trioleate and glycerol monostearate; polyethylene or polypropylene oxide derivatives having pendant hydrophobic groups such as phenoxy or phenyl groups, for example, alkyl-phenoxypoly (ethyleneoxy) ethanols having alkyl groups containing about 7 to about 18 carbon atoms and about 4 to about 100 ethyleneoxy units.

There are many commercially available forms of the aforementioned types of surfactants. Lignosulfonic acids and their water soluble salts and hydroxylated carboxylic acids and their water soluble salts are examples of surfactants that have been used to good advantage.

The surfactant can be included in the reaction mixture in various ways. For example, the surfactant can be included in the water that is added to the laterite and lime. If burnt lime is employed, the surfactant can be added to the water used to slake the lime. A solution of the surfactant can also be added to the laterite during the grinding thereof. Good results have been obtained also by drying the laterite in order to eliminate any free water that may be present therein, and then utilizing the dried laterite in a reaction mixture to which water containing the surfactant is added.

The amount of surfactant used can vary over a wide range and will depend on various factors, for example the hardness of the water included in the reaction mixture, the specific laterite and lime used and the amount of water added to the mixture. In general the amount of surfactant can be about 0.1 to about 3 weight percent of the water or even higher added to the reaction mixture.

After the components are pressure formed, they are desirably transferred or transported to an appropriate station for steam curing. The steam curing may take place in equipment of several different forms, but, essentially, what is herein referred to as steam curing comprises subjection of the pressure formed components to the curing temperature in a vapor saturated atmosphere, or submerged in water, or in a condition in which each component is enclosed in a manner which prevents the escape of any water from the component as pressure formed.

This steam curing or moisture saturated condition can be established in several different ways. For example, it may be established by placing the components in a chamber or room in which water vapor or steam is introduced and in which the components are subjected to the desired degree of heating. This may be accomplished either by heating water within the chamber and thus generating the required saturated atmosphere or by a separate steam generator arranged to feed the steam into the curing chamber.

Another technique which may be employed is to enclose the components within a bag formed, for example, of impervious plastic material, which bag may be placed in the sun and, if desired, some water vapor or water may be introduced into the bag so that the appropriate curing temperature may be attained in the presence of the saturated atmosphere.

Still further the steam curing condition may be established by wrapping individual components or groups of such components with plastic film closely fitting the components or the group thereof, and then subjecting the wrapped components to heating, in which event the plastic wrapping prevents any appreciable loss of water from the compressed components and maintains the desired saturated atmosphere at the surface of the component or components.

Still another alternative arrangement is the use of a tent, preferably a plastic tent which is arranged so that the edges of the tent may be sealed thereby preventing loss of the desired saturated atmosphere within the curing zone enclosed by the tent. Such a tent may also have a supply of water for vaporization.

In connection with the foregoing techniques, it will be understood that in any case heating means or heating elements may be included within the chamber, the bag, or the enclosure or the tent surrounding the components being cured. The use of a plastic bag, plastic wrapping or a tent is particularly well suited to attainment of the desired curing temperature merely by placing the bagged or wrapped or tented components in the sun. The use of solar heat may be supplemented by other heating.

The foregoing techniques readily provide the steam curing conditions which are important in the practice of this invention. Essentially the steam curing serves to insure reaction between ions liberated from the various minerals entering into the reaction in a water phase between the grains of the reaction mix.

It is also of advantage in the practice of this invention that the steam curing is carried out and is effective for the important purpose above referred to without the necessity of elevating the pressure above atmospheric pressure. All of the curing arrangements described will provide the desired moisture saturated environment without raising the pressure above the ambient pressure.

Because the binder in components prepared according to the invention includes stable calcium aluminate hydrates, the cured material of the components is stable at very high temperatures and can be used as a refractory material, for instance for furnace linings or in fireplaces. Tests show that the components of the present invention are more resistant to high temperatures than sand-lime bricks and concrete. Under equal conditions the sand-lime bricks and concrete disintegrate, whereas the components of this invention retain shape and considerable strength.

Because of the presence of the stable aluminate hydrates, the cured material of the present invention has better resistance than Portland Cement Concrete against attack of pure and slightly acidic water. It also has good sulphate resistance.

Measurement of the components of the invention by standard tests used for building materials shows that the components are equivalent to sand-lime bricks with respect to frost resistance, drying shrinkage and water absorption and have much less tendency toward efflorescence.

Building components produced by means of the process used in this invention are normally yellow, brown or red due to the iron-oxide content of the laterite. The density is between 2000 and 2200kg/m$^3$ and the compressive strength is comparable to the strength of the best quality of sand-lime bricks as illustrated by examples given herebelow. Also the modulus of elasticity is equivalent to that of concrete.

It is also contemplated according to the present invention to introduce reinforcement fibers into the mixture to be pressure molded for the purpose of developing certain additional strength characteristics in components of various sizes and shapes. This may be useful in components of any shape, but is of particular advantage in components of certain shapes, for instance sheet or board type of components or components of elongated shape such as beams or studs or the like.

While it is well known to utilize asbestos reinforcement fibers in various cementitious articles, the use of certain other fibers including glass fibers and also various fibers made of synthetic resins has not been practicable in at least most cementitious articles because of the fact that in general these materials are sufficiently alkaline to deteriorate or degrade various synthetic fibers as well as glass fibers. It has also been impractical to include glass or synthetic fibers in products which are to be autoclaved or burnt.

Because of the substantial absence of alkali and alkali earth metals in the natural laterite and the small amount of free lime present in the products it is practicable to utilize various of the synthetic resin fibers as well as glass fibers for reinforcement.

In order to assure substantial inertness with respect to the fibers and stability of the composition of which the components are formed in accordance with the present invention, the ratio or proportions of certain of the ingredients should preferably be such that the quantity of lime is not in excess of the stoichiometric quantity required for reaction. If the quantity of lime be kept somewhat lower than the stoichiometric quantity it may be assured that substantially all the lime is reacted and that the mixture of which the components are formed will be substantially inert and stable, and this in turn will assure that fibers introduced, such as glass fibers will not be deteriorated by alkaline attack. In order to assure such an inert condition it is of course desirable to effect curing for a time sufficient to effect reaction with substantially all of the lime added.

A small residue of CaO ordinarily remains, usually less than one or two percent. Nevertheless, the products made with laterite contain much less alkalinity than products based upon the use of Portland Cement which latter contain a residual lime content increasing in curing even up to about 25 percent of the mix. From this it will be seen that the process of the present invention is clearly distinguished from prior processes employing Portland Cement since in the latter lime is liberated during hydration, while the lime decreases during the reaction of laterite-lime mixes.

When the composition to be used is formulated in this manner, substantial quantities of reinforcement fibers may be introduced either in the form of strands, rovings, mats or other suitable forms of fibers. Moreover random strand material, such as chopped glass strands may also be utilized. Naturally, in the case of thin or elongated components, elongated reinforcement elements are desirable in order to increase strength as against flexure.

The amount of reinforcement fibers employed may run up to about 25 weight percent of the mixture of lime and laterite. For some appreciable effect the amount of fibers employed should be at least 5 weight percent. It will be understood that steel or other metal fibers or asbestos fibers may also be used if desired.

For incorporation of fibers into the mix before formation of the components, it is preferred to effect the intermixture of the fibers with the other solid constituents in the presence of more water than is desired for forming and curing the components. It is easier to effect intimate admixture in this manner. After the fibers have been admixed, the excess water should be removed and this may be done either before or during the forming operation. For example, the unformed material may be subjected to vacuum and/or warming.

Steel reinforcement and prestressing of components is contemplated, which is of advantage, for instance in the production of pipes.

According to the invention, components of a wide variety of shapes and sizes for a variety of purposes may be made, including not only bricks or blocks, roof and floor tiles, but also beams, studs, boards, and even tubular components, or components for lining ducts or irrigation canals. While it is contemplated to pressure form a variety of components by use of a mold or form, it is also possible to pressure form certain of the products by techniques other than molding, for instance by pressure extrusion, die casting, or rolling. In the event of pressure extrusion or rolling, a continuously produced length may be cut at intervals in order to form components of the desired size.

In various of the pressure forming operations, and especially when using a mold, the powder mix is desirably precompressed either by vibration of the mold itself or by employment of a conveyor arrangement for delivering the powder mix from the source of supply to the mold, which conveyor arrangement tends to expel air from the powder mix during transit. As above noted when using pressure molds it is contemplated that the consistency of the laterite-lime-water mix be of free flowing powdery character. This greatly facilitates filling or loading the molds. Moreover, it is surprising indeed that the components formed from a mix of such free flowing consistency will be coherent and shape retaining, and thus are readily handleable.

The surfaces of the components are strikingly smooth and dense and therefore do not readily absorb water.

Moreover the surfaces readily accept painting and provide good adherence to plaster and mortar.

According to the invention the surface characteristic may be modified in various respects.

Thus, in accordance with another aspect of the invention specially formulated materials may be applied to one or more surfaces of the components in order to contribute special surface characteristics. For example, during the molding a surface layer is applied, such surface layer being formulated with a limelaterite mix also containing an aqueous dispersion of a resin material such as polyethylene, polyvinylchloride, acrylic or other thermoplastic resins. Fluorocarbon resins such as polytetrafluoroethylene may also be used in this manner. Such a layer should preferably be pressed in the mold and upon curing of the components, chemical or wear resistant surfaces may be provided.

In another variant, various resins, such as those mentioned, may be applied as a coating on the surface of pressure formed components. This may be done after curing but if done before curing, the curing will improve the bonding of the coating material.

Certain thermosetting resins, such as polyurethane, epoxy and polyester resins may also be used in various ways referred to above for developing special surface characteristics. Such thermosetting resins are advantageously formulated so as to cure at a temperature below 100° C.

The polyester resins are particularly advantageous because they are of low cost and can be used in the components without degradation because of the low alkali content and substantial inertness of the material, this being in contrast to cement based materials in which it is not practicable to use the polyesters because of the alkali attack.

Where the resin material is to be applied only to the surface of the components (either as a coating or as a thin surface layer) several different procedures may be followed. Thus, the resin may be applied to one or more surfaces of the mold in which case it will be transferred to the surfaces of components being made during pressing, and this technique is especially advantageous because the resin in the mold will serve as lubricant in the molding operation.

Resin material may be brought to a surface or surfaces of a mold by forming mold walls of porous metal, for example of the kind used in self lubricating bearings. It is contemplated to pressure feed the resin material through such a porous mold wall during the pressure forming of the component. This is accomplished by applying to the resin supply a pressure in excess of the molding pressure in order to assure that the resin will flow through the porous mold wall and coat the surface of the component. By regulating this excess resin pressure the depth of penetration of the resin into the surface layer of the component may be controlled.

The smoothness of the surface of the components being molded will be enhanced by application of resin coatings as described above and in addition chemical resistance, wear resistance, water repellancy and other surface characteristics may be imparted. Smoothness may be enhanced even by applying water only to the surfaces for instance by means of the porous mold wall above described.

Various of the resin materials mentioned above for use in developing special surface characteristics may be employed by dispersing or distributing such resins in the entire powder mix rather than merely applying those resins to the surface or in a surface layer of the products.

Still another specialized surface characteristic which is contemplated results from the use of a silicone resin, which may either be sprayed or otherwise applied to the surface of the components, either in cured or uncured condition, preferably the latter. This is of particular advantage in the production of building blocks or bricks intended for the construction of mortar-free walls, because the presence of the silicone at the surface of the blocks contributes a frictional characteristic which assists in maintaining the stability of a mortar-free wall.

Components having very smooth surfaces may be formed by applying a surface layer formed of a mix incorporating very finely ground laterite. In this way very smooth surfaces may be provided without the necessity of finely grinding all of the laterite used.

It is mentioned that the color of the components will vary according to the content and color of the laterite used. For example, the components are frequently red or reddish brown due to the iron oxide content. If desired this red color may be made more pronounced or intense by adding iron oxide. It is also contemplated that other minerals, such as metal salts may be added to the mix in order to contribute other colors. For instance, copper salts may be added in order to contribute greenish or bluish tones to the components.

Since the components are shaped from fine particles by pressure forming, the surface is well adapted to receive relief pattern molding or molding in special shapes having sharply defined contours and having sharp angular edges.

In connection with forming the components it is pointed out that since the raw mix may be formulated so as to be of powdery nature it is contemplated to fill molds or forms pneumatically.

EXAMPLE 1

A laterite from Accra in Ghana of the following composition is used:

38% $SiO_2$, 12% $Al_2O_3$ and 43% $Fe_2O_3$. The laterite is ground to a grain-size where 25% is less than 0.1 mm and 75% is between 0.1 mm and 1 mm. 83 weight parts of this laterite are mixed with 17 weight parts $Ca(OH)_2$ and 10 weight percent water is added. By applying a mechanical pressure of 300 kg/cm$^2$ specimens of good coherence are produced. The specimens are transferred to a container where they are steam-cured at 97° C. After 3 hours the compressive strength was 75 kg/cm$^2$; after 6 hours the strength was 120 kg/cm$^2$; after 10 hours the strength was 155 Kg/cm$^2$; after 24 hours the strength was 275 kg/cm$^2$; and after 7 days a maximum compressive strength of 325 kg/cm$^2$ was obtained. The strength was not improved any further after 80 days additional curing.

The shrinkage of test specimens cured for 24 hours was 0.06 percent upon drying from 100 percent relative humidity at 20° C. to 20 percent relative humidity at 60° C. Under the same conditions, the shrinkage of specimens cured for 7 days was 0.028 percent.

The stability of a series of test specimens was studied during 180 days storage in water at 20° C. No drop in compressive strength of the product was observed during prolonged storage in water.

EXAMPLE 2

The same laterite and same mix composition as in Example 1 were used to produce test specimens which were steam cured at various temperatures and for various periods of time. The compressive strength values are shown in Table I.

TABLE I

| Time of steam curing days | Temp. of steam curing °C. | Comp. strength kg/cm$^2$ |
| --- | --- | --- |
| 1 | 80 | 110 |
| 2 | 80 | 200 |
| 7 | 80 | 245 |
| 3 | 60 | 75 |
| 7 | 60 | 115 |
| 3 | 40 | 35 |
| 7 | 40 | 45 |

EXAMPLE 3

In the same way as in Example 1, i.e. with the same mix proportions between laterite, lime and water, and by steam curing at 97° C. for 24 hours, test specimens were produced from Kenya (Nairobi) laterite of the following composition:

34% SiO$_2$, 25% Al$_2$O$_3$, 28% Fe$_2$O$_3$

This produced excellent components having an average compressive strength of 335 kg/cm$^2$.

EXAMPLE 4

Similar tests were conducted with laterites obtained from Japan, Syria, Mexico, Thailand, Singapore, Italy and Greece.

Compressive strength values obtained by curing at 97° for 24 hours with these and with the laterite of Examples 1 and 3 are presented in Table 2, where they are compared with the requirements of the British Standard No. 187 for various qualities of sand-lime bricks.

TABLE II

| Material | Comp. strength kg/cm$^2$ |
| --- | --- |
| Sand-lime bricks (Class 5) | 350 |
| Kenya | 335 |
| Sand-lime bricks (Class 4) | 280 |
| Japan | 280 |
| Ghana | 275 |
| Singapore | 235 |
| Mexico | 230 |
| Syria | 220 |
| Sand-lime bricks (Class 3) | 210 |
| Thailand | 206 |
| Italy | 190 |
| Greece | 180 |
| Sand-lime bricks (Class 2) | 140 |
| Sand-lime bricks (Class 1) | 70 |

I claim:

1. A lateritic structural building component pressure formed in a mold from a mixture of 2–15 weight percent of lime (as CaO) and 55–93 weight percent of laterite, the laterite containing iron oxide and silicon and aluminium in the form of oxides and/or silicates thereof, the silicon content of the laterite including from 10 to 50 percent quartz sand based on the weight of the laterite and the laterite containing at least 8 weight percent of aluminium calculated as Al$_2$O$_3$, the building component comprising a compressed mixture of iron oxide and silicon oxide and/or silicate, and the reaction product of lime, water and aluminium, and in which said reaction product comprises stable calcium aluminate hydrates predominately of the formula 3CaO.Al$_2$O$_3$.6H$_2$O, and the building component containing a free lime (as CaO) content of less than one or two percent, and the component having a compressive strength higher than 140 kg/cm$^2$.

2. A lateritic structural building component pressure formed in a mold from a mixture of 2–15 weight percent of lime (as CaO) and 55–93 weight percent of laterite, the laterite containing iron oxide and silicon and aluminium in the form of oxides and/or silicates thereof, the building component comprising a compressed mixture of iron oxide and silicon oxide and/or silicate, and the reaction product of lime, water and aluminium, and in which said reaction product comprises stable calcium aluminate hydrates including 3CaO.Al$_2$O$_3$.6H$_2$O, and the building component containing a free lime content of less than one or two percent lime (as CaO), and the component having a compressive strength higher than 70 kg/cm$^2$.

3. A building component according to claim 2 wherein the silicon content includes from 10 to 50 weight percent of quartz sand based on the weight of the laterite.

4. A building component according to claim 2 wherein at least 4 weight percent of Fe$_2$O$_3$ is present in the laterite.

5. A building component according to claim 2 wherein the grain size of the laterite is less than 2mm maximum size.

6. A building component according to claim 2 and further having from 5 to 25 weight percent of reinforcing fibers distributed therein.

7. A building component according to claim 5 in which the component is substantially inert and in which the reinforcing fibers are glass fibers or synthetic resin fibers.

8. A building component according to claim 2 and further having a chemically resistant resin material at the surface thereof.

9. A building component according to claim 8 in which a chemically resistant resin material is distributed throughout the mass of the component.

10. A building component according to claim 2 and further having a silicone resin at the surface thereof.

11. A lateritic structural building component pressure formed in a mold from a mixture of 2–15 weight percent of lime (as CaO) and 55–93 weight percent of laterite, the laterite containing iron oxide and silicon and aluminium in the form of oxides and/or silicates thereof, the silicon content of the laterite including from 10 to 50 percent quartz sand based on the weight of the laterite and the laterite containing at least 8 weight percent of aluminium calculated as Al$_2$O$_3$, the building component having a density of 2000 to 2200 kg/m$^3$, and comprising a compressed mixture of iron oxide and silicon oxide and/or silicate, and the reaction product of lime, water and aluminium, and in which said reaction product comprises stable calcium aluminate hydrates predominately of the formula 3CaO.Al$_2$O$_3$.6H$_2$O, and the building component having a lime (as CaO) content of less than one or two percent, and the component having a compressive strength higher than 140 kg/cm$^2$.

12. A lateritic structural building component pressure formed in a mold from a mixture of 2–15 weight percent of lime (as CaO) and 55–93 weight percent of laterite, the laterite containing iron oxide and silicon and aluminium in the form of oxides and/or silicates thereof, the building component having a density of 2000 to 2200 kg/m$^3$ and comprising a compressed mixture of iron oxide and silicon oxide and/or silicate, and the reaction product of lime, water and aluminium, and in which said reaction product comprises stable calcium aluminate hydrates including 3CaO.Al$_2$O$_3$.6H$_2$O, and the building component having less than 1 or 2 percent of free lime (as CaO), and the component having a compressive strength higher than 70 kg/cm$^2$.

* * * * *